United States Patent Office 3,361,747
Patented Jan. 2, 1968

3,361,747
DERIVATIVES OF QUINOXALINONE
Gerhard R. Wendt, Havertown, and Kurt W. Ledig, Philadelphia, Pa., assignors to American Home Products Corporation, New York, N.Y., a corporation of Delaware
No Drawing. Filed Sept. 10, 1964, Ser. No. 395,585
18 Claims. (Cl. 260—250)

This invention is concerned with compounds classified in the art of chemistry as cyclopentaquinoxalinones and benzocyclopentaquinoxalinones.

As determined by standard tests in warm blooded animals, these compounds exhibit potent anti-inflammatory activity.

The claimed compounds can be represented by the general formula:

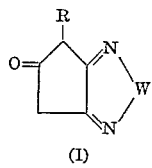

(I)

In the above general formula, W is one of the moieties shown below:

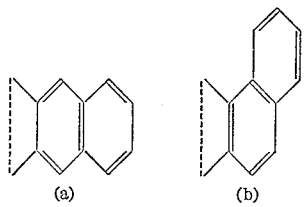

and

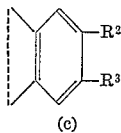

(c)

R is selected from the group of (lower)alkyl, halo(lower)alkylphenyl, phenyl, benzyloxy(lower)alkyl, nitrophenyl, (lower)alkylphenyl, benzyl, halophenyl, and (lower)alkoxyphenyl, where the substituents may be in the o-, m-, or p-positions on the phenyl ring. $R^2$ and $R^3$ are selected from the group of hydrogen, chlorine, fluorine, bromine and methyl, except that when both $R^2$ and $R^3$ are hydrogen, and R is lower alkyl, R has more than one carbon atom in the alkyl chain and, also, when both $R^2$ and $R^3$ are hydrogen R is not phenyl. As used herein the term "lower" refers to both straight-chained and branched hydrocarbon groups containing from 1 to 4 carbon atoms therein.

The claimed compounds are prepared by the reaction shown below:

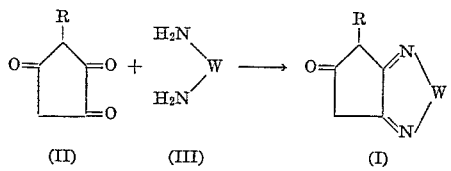

wherein R and W are as above stated.

To prepare the claimed compounds a known cyclopentane-1,2,4-trione (II) is reacted as above shown with a known o-diamino compound (III). This is done by dissolving the trione in water and adding to the resulting solution a solution of the diamino compound in alcohol which is acid-catalyzed with acetic acid or with a mineral acid.

As needed, depending on the complexity of the molecule of the diamino compound heat is applied to accelerate the rate of reaction. Generally, however, it is sufficient to heat the reactants to the boiling point of the reaction mixture. The product precipitates upon standing at room temperature. It can be purified by recrystallizing from dimethyl formamide or acetic acid.

It will readily be appreciated from the preceding description and from the accompanying examples, that, when the trione starting material is reacted as above described with a 2,3-diaminonaphthalene, the product is a benzo[g]cyclopenta[b]quinoxalin-2-one:

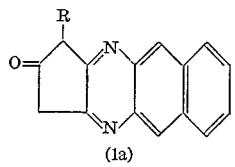

(1a)

where R is as above.

Similarly, it will be understood that when the trione starting material is reacted with a 1,2-diaminonaphthalene the product is a benzo[f]cyclopenta[b]quinoxalin-9-one of the formula:

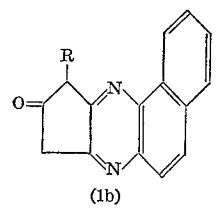

(1b)

where R is as above. Finally, it should be noted that reaction of the described trione with an o-phenylenediamine in the maner described herein, leads to the production of a cyclopenta[b]quinoxalin-2-one which has the formula:

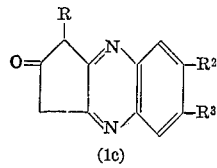

(1c)

wherein R, $R^2$ and $R^3$ are as above stated.

The compounds of the present invention can be prepared and administered in a wide variety of oral and parenteral dosage forms, singly, or, in combination with other coacting compounds. They can if desired be associated with a carrier which can be a solid material or a liquid in which the compound is dissolved, dispersed, or suspended. The solid compositions can take the form of tablets, powders, capsules, pills, or the like, preferably in unit dosage forms for simple administration or precise dosages. The liquid composition can take the form of solutions, emulsions, suspensions, syrups, or elixirs. Such conventional solid carriers as sucrose, starches, etc., or liquid vehicles such as non-toxic alcohols, glycerine, or the like, may be thus used.

When so administered by oral or intraperitoneal routes in doses of from 5 to 200 mg./kg. of body weight the compounds of the invention will moderate and alleviate inflammatory disorders. Moreover, their utility, in addition to the specific area noted, also extends to the area of veterinary medicine as well as experimental pharmacology.

The following examples will serve to further illustrate the invention in its various product and process aspects. These several examples are purely exemplary of the invention and are not intended to limit its concept in any manner.

*Example 1.—6,7-dimethyl-1,3-dihydro-1-propyl-2H-cyclopenta[b]quinoxalin-2-one*

To 250 ml. of a solution containing 5.0 g. of 3-propyl-1,2,4-cyclopentanetrione was added a solution of 5.0 g. of 4,5-dimethyl-o-phenylenediamine in 100 ml. of alcohol and 400 ml. of water. The reaction mixture was brought to a boil and after cooling, the precipitate was filtered off. Recrystallization from alcohol afforded the desired product; M.P. 290° C. (dec.). (Found: C, 75.62; H, 7.34; N, 10.96. $C_{16}H_{18}N_2O$ requires: C, 75.56; H, 7.13; N, 11.02%.)

*Example 2.—6,7-dichloro-1,3-dihydro-1-propyl-2H-cyclopenta[b]quinoxalin-2-one*

To 250 ml. of a solution containing 5.0 g. of 3-propyl-1,2,4-cyclopentanetrione was added a solution of 5.0 g. of 4,5-dichloro-o-phenylenediamine in 800 ml. water and 100 ml. alcohol. The resulting solution was brought to a boil and let stand at 25° overnight. The precipitate was filtered and recrystallized from 150 ml. of dimethylformamide to yield 5.3 g. of the title compound, M.P. 290° C. (dec.). (Found: C, 57.29; H, 4.12; N, 9.80; Cl, 24.00. $C_{14}H_{12}Cl_2N_2O$ requires: C, 56.95; H, 4.19; N, 9.49; Cl, 24.03%).

*Example 3.—6,7-dichloro-1,3-dihydro-1-methyl-2H-cyclopenta[b]quinoxalin-2-one*

A hot aqueous solution of 6.0 g. of 3-methyl-1,2,4-cyclopentanetrione in 200 ml. of water was treated with a solution of 5.0 g. of 4,5-dichloro-o-phenylenediamine in 200 ml. of alcohol and 20 ml. of glacial acetic acid. The reaction mixture was heated for a few minutes; the resulting precipitate was filtered and recrystallized from dimethyl formamide to yield 3.6 g. of the title compound; M.P.>350° C. (Found: C, 54.31; H, 2.75; Cl, 26.20; N, 10.76. $C_{12}H_8Cl_2N_2O$ requires: C, 54.14; H, 3.03; Cl, 26.29; N, 10.53%.)

*Example 4.—6,7-dichloro-1,3-dihydro-1-(2-benzyloxyethyl)-2H-cyclopenta[b]quinoxalin-2-one*

A suspension of 2.0 g. of 2-(2-benzyloxyethyl)-4-phenylimino-1,3-cyclopentanedione, (prepared as disclosed in copending application U.S. Ser. No. 351,816), 125 ml. of 2 N sulfuric acid, and 25 ml. of alcohol was refluxed for 4 hours. The resulting solution containing 3-(2-benzyloxyethyl)-1,2,4-cyclopentanetrione was then refluxed with a solution of 3.0 g. of 4,5-dichloro-o-phenylenediamine in 100 ml. of alcohol for a few minutes. The precipitate was filtered and recrystallized from acetic acid to give the title compound melting at 230° C. (dec.). (Found: C, 61.75; H, 4.15; N, 7.56; Cl, 18.3. $C_{20}H_{16}Cl_2N_2O_2$ requires: C, 62.03; H, 4.17; N, 7.24; Cl, 18.31%.)

*Example 5.—1,3-dihydro-6,7-dimethyl-1-methyl-2H-cyclopenta[b]quinoxalin-2-one*

To 100 ml. of a boiling aqueous solution of 3-methyl-cyclopentane-1,2,4-trione was added 5.0 g. of 4,5-dimethyl-o-phenylenediamine in 100 ml. of 95% alcohol and, 10 ml. acetic acid and the reaction mixture allowed to stand at 25° overnight. The precipitate was filtered and recrystallized from 200 ml. acetic acid to obtain 1.5 g. of the title compound; dec. 316–320° C. (Found: C, 74.13; H, 6.36; N, 12.09. $C_{14}H_{14}N_2O$ requires: C, 74.31; H, 6.24; N, 12.38%.)

*Example 6.—6,7-dichloro-1,3-dihydro-1-ethyl-2H-cyclopenta[b]quinoxalin-2-one*

An aqueous solution (300 ml.) of 5.0 g. of 3-ethyl-1,2,4-cyclopentanetrione was refluxed with a solution of 4,5-dichloro-o-phenylenediamine in 200 ml. of alcohol and 20 ml. of glacial acetic acid for a few minutes. The resulting precipitate was filtered and recrystallized from dimethyl formamide to yield 3.6 g. of the title compound; melting at 316–318° C. (dec.). (Found: C, 55.61; H, 3.54; Cl, 25.10; N, 10.20. $C_{13}H_{10}Cl_2N_2O$ requires: C, 55.54; H, 3.59; Cl, 25.23; N, 9.97%.)

*Example 7.—1,3-dihydro-6,7-dimethyl-1-ethyl-2H-cyclopenta[b]quinoxalin-2-one*

To 250 ml. of an aqueous solution containing 5.0 g. of 3-ethylcyclopentane-1,2,4-trione was added 5.0 g. of 4,5-dimethyl-o-phenylenediamine in 100 ml. 95% alcohol and 20 ml. acetic acid. On heating the reaction mixture to the boiling point a material precipitated which after standing overnight was filtered and recrystallized from 275 ml. dimethyl formamide to give 4.9 g. of the title compound, melting at 292–295° C. (Found: C, 74.92; H, 6.57; N, 11.75. $C_{15}H_{16}N_0$ requires: C, 74.97; H, 6.71; N, 11.66%.)

*Example 8.—1-butyl-1,3-dihydro-2H-cyclopenta[b]quinoxalin-2-one*

To 250 ml. of an aqueous solution containing 5.0 g. of 3-butyl-cyclopentane-1,2,4-trione was added 4.7 g. of o-phenylenediamine in 100 ml. 95% alcohol and 10 ml. of acetic acid. The reaction mixture was brought to a boil and let stand at 25° C. overnight. The precipitate was filtered and recrystallized from 150 ml. of dimethyl formamide to give 5.7 g. of the title compound; M.P. 260–262° C. (Found: C, 75.10; H, 6.68; N, 11.48. $C_{15}H_{16}N_2O$ requires: C, 74.97; H, 6.71; N, 11.66%.)

*Example 9.—1-butyl-6,7-dichloro-1,3-dihydro-2H-cyclopenta[b]quinoxalin-2-one*

To 90 ml. of an aqueous solution containing 3.0 g. of 3-butylcyclopentane-1,2,4-trione was added 1.8 g. of 4,5-dichloro-o-phenylenediamine in 36 ml. of 95% alcohol and 3.6 ml. glacial acetic acid. The solution was brought to a boil and let stand at 25° C. overnight. The precipitate was filtered and recrystallized from 50 ml. dimethylformamide to obtain 1.5 g. of the title compound, M.P. 280–281° C. (Found: C, 59.76; H. 4.65; N, 9.33; Cl, 22.6. $C_{15}H_{14}Cl_2N_2O$ requires: C, 57.96; H, 4.65; N, 9.33; Cl, 22.93%.)

*Example 10.—1-butyl-1,3-dihydro-6,7-dimethyl-2H-cyclopenta[b]quinoxalin-2-one*

To 250 ml. of an aqueous solution containing 5.0 g. of 3-butylcyclopentane-1,2,4-trione was added a solution of 5.0 g. of 4,5-dimethyl-o-phenylenediamine in 100 ml. of 95% alcohol and 10 ml. of acetic acid. The solution was brought to a boil and let stand at 25° C. overnight. The precipitate was filtered and recrystallized from 300 ml. dimethylformamide to obtain 3.3 g. of the title compound which decomposes at 285° C. (Found: C, 75.74; H, 7.74; N, 10.56. $C_{17}H_{20}N_2O$ requires: C, 76.08; H, 7.51; N, 10.44%.)

The same procedures of the above examples are employed to prepare the compounds listed in the following table using the appropriate starting compounds. This list is given to avoid unnecessary repetition of experimental details.

| Example No. | Formula | R | $R^2$ | $R^3$ |
|---|---|---|---|---|
| 11 | 1c | Benzyl | Hydrogen | Hydrogen. |
| 12 | 1c | p-Methoxyphenyl | do | Do. |
| 13 | 1c | o-Butoxyphenyl | do | Do. |
| 14 | 1c | p-Trifluoro-methylphenyl | Bromine | Bromine. |
| 15 | 1c | m-Chlorophenyl | do | Do. |
| 16 | 1c | 4-benzyloxybutyl | Hydrogen | Hydrogen. |
| 17 | 1c | m-Nitrophenyl | do | Do. |
| 18 | 1c | m-Chlorophenyl | Chloro | Chloro. |
| 19 | 1c | p-Bromophenyl | Hydrogen | Hydrogen. |
| 20 | 1c | o-Tolyl | do | Do. |
| 21 | 1c | m-Butylphenyl | do | Do. |
| 22 | 1c | 3-benzyloxypropyl | Methyl | Methyl. |
| 22a | 1c | Phenyl | Bromine | Bromine. |
| 22b | 1c | do | Fluorine | Fluorine. |

*Example 23.—1,3-dihydro-1-methyl-2H-benzo[g]
cyclopenta[b]quinoxalin-2-one*

To a boiling aqueous solution of 6.0 g. of 3-methyl-cyclopentane-1,2,4-trione was added 5.0 g. of 2,3-diamino-naphthalene in 200 ml. 95% alcohol and 10 ml. glacial acetic acid. The reaction mixture was allowed to stand at 25° overnight. Recrystallization of the precipitate from dimethylformamide gave 1.1 g. of the title compound which decomposes at 345° C. (Found: C, 77.25; H, 4.69; N, 11.00. $C_{16}H_{12}N_2O$ requires: C, 77.40; H, 4.87; N, 11.28%.)

*Example 24.—1,3-dihydro-1-ethyl-2H-benzo[g]
cyclopenta[b]quinoxalin-2-one*

An aqueous solution (300 ml.) of 5.0 g. of 3-ethyl-cyclopentane-1,2,4-trione was refluxed with a solution of 5.0 g. of 2,3-diaminonaphthalene in 200 ml. of alcohol and 20 ml. of acetic acid. The resulting precipitate was filtered and recrystallized from dimethyl formamide to yield 4.5 g. of the title compound; M.P. 318° C. (dec.). (Found: C, 77.76; H, 5.45; N, 10.43. $C_{17}H_{14}ON_2$ requires: C, 77.84; H, 5.38; N, 10.68%.)

*Example 25.—1,3-dihydro-1-propyl-2H-benzo[g]
cyclopenta[b]quinoxalin-2-one*

An aqueous solution (300 ml.) of 5.0 g. of 3-propyl-cyclopentane-1,2,4-trione was refluxed with a solution of 5.0 g. of 2,3-diaminonaphthalene in 200 ml. of alcohol and 20 ml. of acetic acid for a few minutes. The resulting precipitate was filtered and recrystallized from dimethyl formamide to yield 5.5 g. of the title compound; M.P. 310° C. (dec.). (Found: C, 78.02; H, 5.59; N, 10.22. $C_{18}H_{16}N_2O$ requires: C, 78.23; H, 5.84; N, 10.14%.)

*Example 26.—1,3-dihydro-1-butyl-2H-benzo[g]
cyclopenta[b]quinoxalin-2-one*

To 250 ml. of a boiling solution containing 5.0 g. of 3-butylcyclopentane-1,2,4-trione was added 5.0 g. of 2,3-diaminonaphthalene in 200 ml. 95% alcohol and the reaction mixture let stand at 25° overnight. Recrystallization of the precipitate from 100 ml. of dimethylformamide gave 2.2 g. of the title compound; dec. 280° C. (Found: C, 78.23; H, 6.21; N, 9.79. $C_{19}H_{18}N_2O$ requires: C, 78.59; H, 6.25; N, 9.65%.)

*Example 27.—1,3-dihydro-1-(2-benzyloxyethyl)-2H-
benzo[g]cyclopenta[b]quinoxalin-2-one*

A suspension of 2.0 g. of 2-(2-benzyloxyethyl)-4-phenylimino-1,3-cyclopentadione (prepared as disclosed in U.S. Ser. No. 351,816), 125 ml. of 2 N sulfuric acid, and 25 ml. of alcohol was refluxed for 4 hours. The resulting solution containing 3-(2-benzyloxyethyl)-1,2,4-cyclopentanetrione was then refluxed with a solution of 30 g. of 2,3-diaminonaphthalene in 75 ml. of alcohol for a few minutes. The resulting precipitate was filtered and recrystallized from dimethyl formamide to give the title compound: M.P. 235–237° C. (dec.). (Found: C, 78.10; H, 5.21; N, 7.30. $C_{24}H_{20}N_2O_2$ requires: C, 78.24; H, 5.47; N, 7.60%.)

The same procedures of the above examples are employed to prepare the compounds listed in the following table using the appropriate starting compounds. This list is given to avoid unnecessary repetition of experimental details.

| Example No. | Formula | R |
| --- | --- | --- |
| 28 | 1a | Benzyl. |
| 29 | 1a | p-Methoxyphenyl. |
| 30 | 1a | o-Butoxyphenyl. |
| 31 | 1a | p-Trifluoromethylphenyl. |
| 32 | 1a | m-Chlorophenyl. |
| 33 | 1a | 4-benzyloxybutyl. |
| 34 | 1a | m-Nitrophenyl. |
| 35 | 1a | p-Chlorophenyl. |
| 36 | 1a | p-Bromophenyl. |
| 37 | 1a | o-Tolyl. |
| 38 | 1a | m-Butylphenyl. |
| 39 | 1a | 3-benzyloxypropyl. |
| 39a | 1a | Phenyl. |

*Example 40.—8,10-dihydro-10-ethyl-9H-benzo[f]cyclo-
penta[b]quinoxalin-9-one*

An aqueous solution (300 ml.) of 5.0 g. of 3-ethyl-cyclopentane-1,2,4-trione was refluxed with a solution of 5.0 g. of 1,2-diaminonaphthalene in 100 ml. of alcohol and 20 ml. of acetic acid for a few minutes. The resulting precipitate was filtered and recrystallized from dimethyl formamide to yield 2.8 g. of the title compound; M.P. 319° C. (dec.). (Found: C, 77.86; H, 5.37; N, 10.43. $C_{17}H_{14}ON_2$ requires: C, 77.84; H, 5.38; N, 10.68%).

*Example 41.—8,10-dihydro-10-propyl-9H-benzo[f]cyclo-
penta[b]quinoxalin-9-one*

An aqueous solution (300 ml.) of 5.0 g. of 3-propyl-cyclopentane-1,2,4-trione was refluxed with a solution of 5.0 g. of 1,2-diaminonaphthalene in 100 ml. of alcohol and 20 ml. of acetic acid for a few minutes. The resulting precipitate was filtered and recrystallized from dimethyl formamide to yield 1.6 g. of the title compound, M.P. 295° C. (dec.). (Found: C, 78.23; H, 5.84; N, 10.13. $C_{18}H_{16}ON_2$ requires: C, 78.23; H, 5.84; N, 10.14%.)

The same procedure of Examples 40 and 41 is employed to prepare the compounds listed in the following table using the appropriate starting compounds.

| Example No. | Formula | R |
| --- | --- | --- |
| 42 | 1b | Benzyl. |
| 43 | 1b | p-Methoxyphenyl. |
| 44 | 1b | o-Butoxyphenyl. |
| 45 | 1b | p-Trifluoromethylphenyl. |
| 46 | 1b | m-Chlorophenyl. |
| 47 | 1b | 4-Benzyloxybutyl. |
| 48 | 1b | m-Nitrophenyl. |
| 49 | 1b | p-Chlorophenyl. |
| 50 | 1b | p-Bromophenyl. |
| 51 | 1b | o-Tolyl. |
| 52 | 1b | m-Butylphenyl. |
| 53 | 1b | 3-benzyloxypropyl. |
| 54 | 1b | Phenyl. |
| 55 | 1b | p-Fluorophenyl. |

What is claimed is:
1. 1,3 - dihydro-6,7-dimethyl-1-propyl-2H-cyclopenta[b]quinoxalin-2-one.
2. 6,7 - dichloro-1,3-dihydro-1-propyl-2H-cyclopenta[b]quinoxalin-2-one.
3. 6,7 - dichloro-1,3-dihydro-1-methyl-2H-cyclopenta[b]quinoxalin-2-one.
4. 6,7 - dichloro-1,3-dihydro-1-(2-benzyloxyethyl)-2H-cyclopenta[b]quinoxalin-2-one.
5. 1,3 - dihydro-6,7-dimethyl-1-methyl-2H-cyclopenta[b]quinoxalin-2-one.
6. 6,7 - dichloro-1,3-dihydro-1-ethyl-2H-cyclopenta[b]-quinoxalin-2-one.
7. 1,3 - dihydro - 6,7-dimethyl-1-ethyl-2H-cyclopenta[b]quinoxalin-2-one.
8. 1 - butyl-1,3-dihydro-2H-cyclopenta[b]quinoxalin-2-one.
9. 1 - butyl-6,7-dichloro-1,3-dihydro-2H-cyclopenta[b]-quinoxalin-2-one.
10. 1 - butyl-1,3-dihydro-6,7-dimethyl-2H-cyclopenta[b]quinoxalin-2-one.
11. 1,3 - dihydro-1-methyl-2H-benzo[g]cyclopenta[b]-quinoxalin-2-one.
12. 1,3 - dihydro-1-ethyl-2H-benzo[g]cyclopenta[b]-quinoxalin-2-one.
13. 1,3 - dihydro-1-propyl-2H-benzo[g]cyclopenta[b]-quinoxalin-2-one.
14. 1,3 - dihydro-1-butyl-2H-benzo[g]cyclopenta[b]-quinoxalin-2-one.
15. 1,3 - dihydro-1-(2-benzyloxyethyl)-2H-benzo[g]-cyclopenta[b]quinoxalin-2-one.
16. 8,10 - dihydro-10-ethyl-9H-benzo[f]cyclopenta[b]-quinoxalin-9-one.
17. 8,10 - dihydro-10-propyl-9H-benzo[f]cyclopenta-[b]quinoxalin-9-one.

18. A compound selected from the group consisting of those having the formulae:

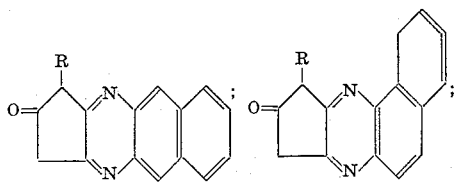

and

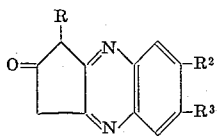

wherein R is selected from the group consisting of (lower)alkyl, benzyloxy(lower)alkyl, (lower)alkylphenyl, (lower)alkoxyphenyl, halo(lower)alkylphenyl, nitrophenyl, benzyl, phenyl and halophenyl; and $R^2$ and $R^3$ are selected from the group consisting of hydrogen, chlorine, bromine, fluorine and methyl, except that when both $R^2$ and $R^3$ are hydrogen, and R is an alkyl group, said alkyl group has at least two carbon therein, and when both $R^2$ and $R^3$ are hydrogen, R is not phenyl.

References Cited
UNITED STATES PATENTS
3,311,626   3/1967   Wendt et al. _____ 260—250

NICHOLAS S. RIZZO, *Primary Examiner.*